United States Patent [19]

Baumgartner

[11] Patent Number: 4,552,370

[45] Date of Patent: Nov. 12, 1985

[54] SET OF WORKPIECE STOPS FOR WORKPIECE CLAMPING COLLET

[76] Inventor: Kenneth A. Baumgartner, 858 Glenlyn Dr., Azusa, Calif. 91702

[21] Appl. No.: 483,658

[22] Filed: Apr. 11, 1983

[51] Int. Cl.⁴ .............................................. B23B 31/20
[52] U.S. Cl. .................................. 279/1 S; 82/34 C; 279/1 R; 408/241 S
[58] Field of Search ............... 279/1 R, 1 S; 82/34 C, 82/34 B, 34 D; 408/241 S

[56] References Cited

U.S. PATENT DOCUMENTS

| | | | |
|---|---|---|---|
| 2,515,289 | 7/1950 | Bergmann | 279/1 S |
| 2,650,098 | 8/1953 | Darling | 279/1 R |
| 2,676,810 | 4/1954 | Landreth | 279/1 S |
| 2,756,059 | 7/1956 | Knapp | 279/1 S |
| 3,720,416 | 3/1973 | Blanchard | 82/34 C X |
| 3,876,214 | 4/1975 | Blanchard | 82/34 C X |

*Primary Examiner*—Gil Weidenfeld
*Assistant Examiner*—Glenn L. Webb
*Attorney, Agent, or Firm*—Sellers and Brace

[57] ABSTRACT

Disclosed is a workpiece collet mountable in a lathe spindle provided with a master stem on which any one of a set of workpiece stops may be mounted and which stem includes a support readily assembled to the collet repeatedly in a predetermined position. The stops differ in length and/or radius to accommodate workpieces of different terminal configurations. This permits one stop to be substituted for another with assurance that its outer end will be spaced a predetermined distance from the adjacent end of the collet when the master stem is reassembled to the collet. Both ends of the master stem are similarly threaded and finished with stop surfaces permitting the stem to be inverted and used to mount a selected one of the set of stops.

8 Claims, 6 Drawing Figures

SET OF WORKPIECE STOPS FOR WORKPIECE CLAMPING COLLET

This invention relates to workpiece clamping collets for use in a lathe spindle, and more particularly to a unique master stem and means for mounting the same in the rear end of a collet repeatedly in a predetermined position to support any one of a set of workpiece stops interchangably with its outer end a predetermined distance inwardly of the forward end of the collet.

BACKGROUND OF THE INVENTION

Many proposals have been made heretofore for workpiece clamping collets mountable in a lathe spindle and having provision for supporting workpiece stops of different sizes and configurations. Many of these include the provision for adjusting the support for the stop but all are subject to serious shortcomings and disadvantages owing to the inordinate amount of time and trouble involved in substituting one stop for another and adjusting the different stop to a precise position relative to the outer end face of the collet. It is common practice among many machinists to custom manufacture a stop for each job. The cost and time involved in constructing and installing the required stop renders it impractical in many instances to take a job if the required number of pieces for the job is relatively small.

Proposals have also been made heretofore to provide a spindle collet with a set of selectively usable stops. Disclosures of this type are to be found in Landreth U.S. Pat. No. 2,676,810 and Blanchard U.S. Pat. No. 3,720,416. Both of these proposals involve a complex assembly having a plurality of components required to be disassembled and reassembled each time a different stop is installed. Lacking in each of these prior proposals is any provision for assuring that, upon reassembly, the forward end of the new stop will be positioned properly until checking measurements have been made and various components are adjusted as necessary to achieve the required setting of the stop.

SUMMARY OF THE INVENTION

The various shortcomings and disadvantages of prior workpiece stop expedients are avoided by this invention. These objectives are achieved by providing an extremely simple unitary subassembly comprising an elongated master stem threaded throughout a major portion of each end and designed to be held locked assembled to the rear end of a clamping collet by a threaded collar provided with a stop flange abutting the rear end of the collet. The master stem is adjustable lengthwise of its mounting collar and securable in a desired position therein by a lock nut. By this simple technique the master stem and its mounting collar can be disassembled from and reassembled as a unit to the rear end of the clamping collet repeatedly with assurance that its inner end will always be in a predetermined position relative to the forward end of the collet.

Both ends of the master stem include a threaded well and external threads selectively usable to support any one of a series of stops each having an identical length when the precision stop surface thereof is assembled against a cooperating stop surface on the end of the master stem. The stops of a set thereof are readily substituted one for another simply by removing the master stem and its mounting collar as a unit and reassembling it with its stop flange in abutment with the end of the collet. Sets of stops of different lengths are readily used with the master stem, either end of which may be mounted to project forwardly from its supporting collar.

Accordingly, it is a primary object of this invention to provide a unique simplified workpiece stop subassembly readily securable as a unit in a predetermined position axially of a spindle clamping collet and including provision for supporting a selected one of a set of workpiece stops.

Another object of the invention is the provision of a workpiece stop supporting subassembly detachably securable in a predetermined position at the rear end of a workpiece clamping collet.

Another object of the invention is the provision of a unitary workpiece stop subassembly for supporting a stop in a precise position comprising a master stem lockable in an adjusted position to a flanged thread supporting collar mateable with the threaded rear end of a workpiece clamping collet.

These and other more specific objects will appear upon reading the following specification and claims and upon considering in connection thereith the attached drawing to which they relate.

Referring now to the drawing in which a preferred embodiment of the invention is illustrated:

Figure 1:
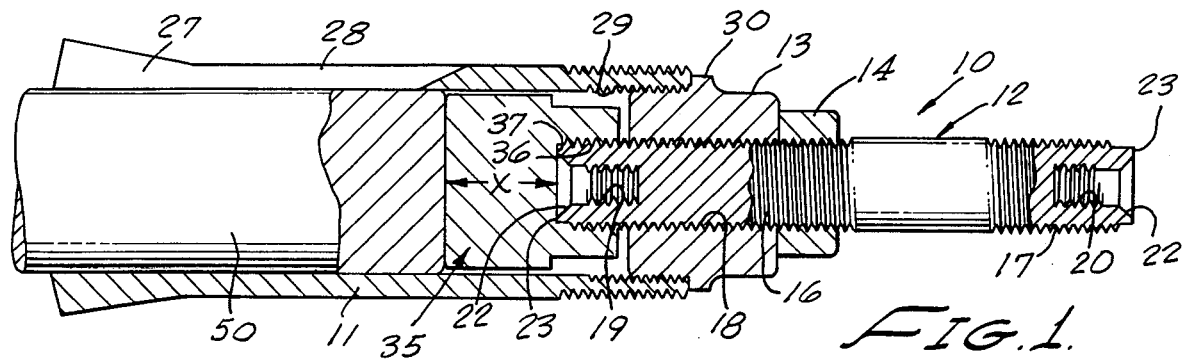
FIG. 1 is a cross sectional view through the workpiece clamping collet of a spindle lathe showing the simple means provided by this invention for supporting a selected one of a set of workpiece stops coaxially of the collet.
Figure 3:
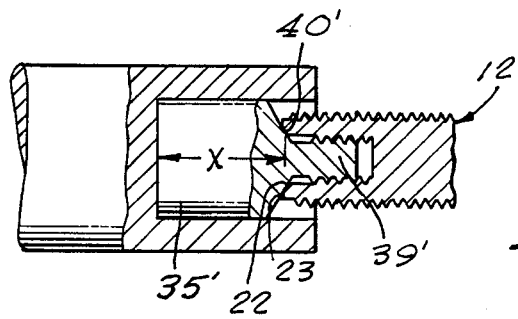
Figure 4:
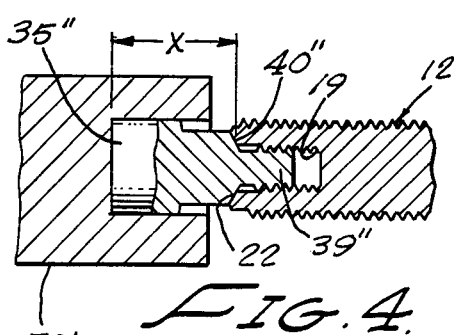
Figure 5:
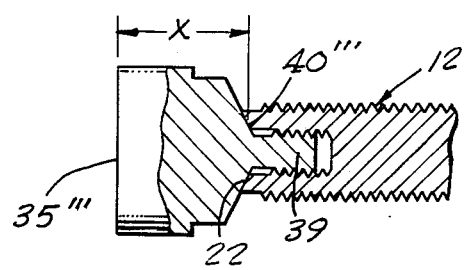
Figure 6:
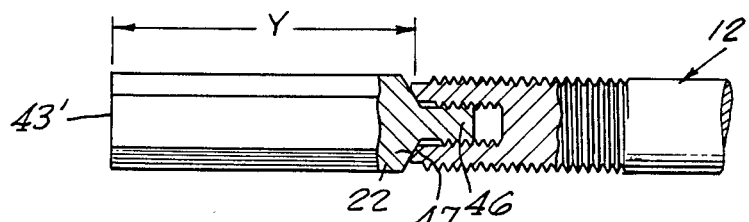

FIGS. 3, 4 and 5 are fragmentary cross sectional views showing other stops of the same set shown in FIG. 1 and the manner in which they are related to the master stem and the end of a workpiece to be clamped in the collet; and FIG. 6 is a view similar to FIGS. 1 and 3-5 but showing an alternate stop from a second set of stops mounted in the master stem. The length of each stop of the second set of stops may be the same or different from that of the first set of stops.

Referring initially and more particularly to FIG. 1, there is shown an illustrative embodiment of the invention showing the unitary stop supporting subassembly of the invention, designated generally 10, mounted in the threaded rear end of a workpiece clamping collet 11. Subassembly 10 comprises a master stem 12, the supporting collar 13 and a lock nut 14.

Master stem 12 is provided at its opposite ends with a relatively long set of external threads 16 and a set of relatively short threads 17 each adapted to mate with the threads 18 of collar 13. Also the opposite ends of master stem 12 are provided with identical threaded wells 19 and 20. The entrance of each well is provided with a precision conical counterbore stop surface 22 and a precision radial stop surface 23 at its rim. The functions of these several stop surfaces will be explained presently in connection with the use of the stops selectively mountable on either end of master stem 12.

The workpiece clamping collet 11 is of a welll known tubular construction having a plurality of clamping jaws 27 distributed about its forward end and separated from one another by a plurality of the usual radial slots 28. The rear end of the collet is threaded internally and externally, the internal threads 29 being matable with the externally threaded master stem mounting collar 13. This collar is provided with an annular flange 30 having a precision radial stop surface assembled into abutment with the arcuately finished radial rear end of the collet, it being understood that the rear end of collar 13 is provided with hexagonal or the like wrench engaging surfaces. Either threaded end of the master stem may be mounted within collar 13 and locked in any desired adjusted position by the lock nut 14.

Any one of the high precision set of workpiece stops 10 is mountable in either end of master stem 12. FIGS. 1, 3, 4 and 5 show three illustrative ones of a first set of stops 35, 35', 35'', 35''' of different diameters each mountable on either end of master stem 12 and each projecting either the same or a different precise distance from either the conical or the radial stop surface 22 or 23 of the master stem. Stop 35 differs from the other three in that it has a threaded well 36 having a precision stop surface 37 at its inner or bottom end, whereas stops 35', 35'' and 35''' are mateable with the well threads 19 or 20 at either end of the master stem. Each of these threaded shanks has a conical surface 40', 40'', 40''' each seatable against the conical surface 22 on the lip of the well at the end of the master stem. As herein illustrated the axial distance between the outer end of each of the set of stops 35, 35', 35'', 35''' and stop surface 23 is identical and designated X on the drawing but it will be understood that this axial distance as well as the diameter may be different between the stops of a set thereof.

Figure 2:
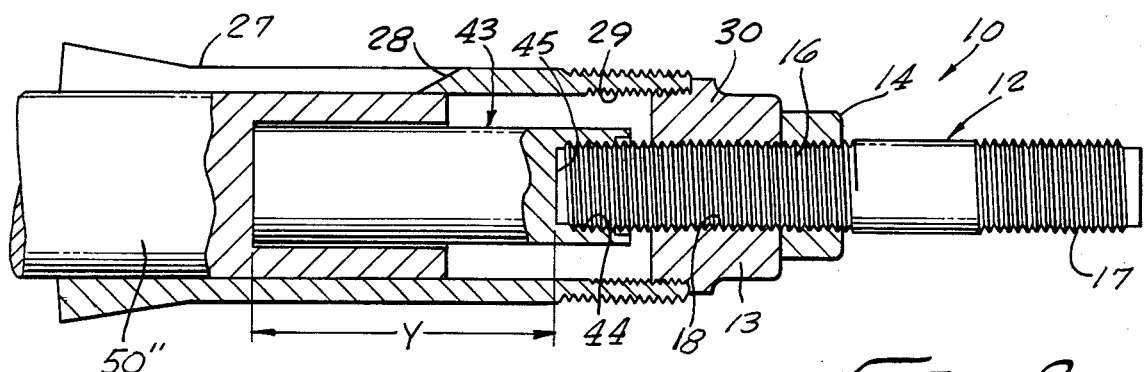
FIG. 2 is a view similar to FIG. 1 but showing a stop from a set thereof supported on the master stem.

Numerous other sets of stops embodying the principles of this invention can be provided and used in the same manner. For example, two stops of a second set are shown in FIGS. 2 and 6 and are structurally similar to the corresponding features of the first set but differ essentially in that each has the same axial distance Y between its outer end and the stop surface thereon engageable either with the stop surface 23 or the stop surface 22 at either end of master stem 12. Thus, stop 43 in FIG. 2 has a threaded well 44 provided with a radial stop surface 45 at its bottom engageable with the radial stop surface 23 of the master stem. A second one of the stops shown at 43' in FIG. 6 has a threaded shank 46 provided at its base with conical stop surface 47 engageable with the conical stop surface 22 at either end of the master stem.

In use, the workman detaches the unitary master stem 12 and its mounting collar 13 from a collet 28 and mounts an appropriate one of the first set of stops on the inner end of master stem 12. For example, if stop 35 shown in FIG. 1 is selected, it is simply threaded onto the outer threads 16 of the master stem until the radial stop surface 23 of that stem is in firm contact with the stop surface 37 at the bottom of the threaded well 36. This having been accomplished, the operator remounts this subassembly unit in the right hand end of collet 11 until the stop surface on flange 30 abuts the end of the collet. He then has assurance that the forward end of stop 35 is at a precise axial distance from the outer end of collet 11 and is in readiness for the insertion of a work piece 50 into collet 11.

Let it now be assumed that the user wishes to perform work on another workpiece 50' shown in FIG. 4 and having a well in its end and wherein the machining operation to be performed on the workpiece requires that the bottom of this well be at the same precise distance from the outer end of the collet as in FIG. 1. The user proceeds by removing the unitary master stem subassembly by unthreading mounting collar 13 from the collet. He then detaches the stop 35 and assembles the new stop 35'' into threaded well 19 until its conical stop surface 40'' engages the conical stop surface 22 in stem 12. The master stem subassembly equipped with stop 35'' is then reassembled to the collet without need for checking the distance between the end of stop 35'' and the outer end of the collet. Any one of the alternate set of stops shown in part only in FIGS. 2 and 6 are employed in the same manner described for the first set of stops.

While the particular set of workpiece stops for workpiece clamping collet herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. In a workpiece clamping collet mountable in a lathe spindle, that improvement which comprises:
   a unitary assembly for supporting a selected one of a set of workpiece stops axially of said collet comprising:
   an externally threaded master stem;
   internally threaded non-adjustable collar means embracing said master stem and having a threaded shank having a shoulder in abutment with the end of said collet for securing said non-adjustable collar means in a predetermined position axially of said collet;
   a lock nut mounted on said master stem engagable with said collar means to lock said master stem in a predetermined position axially of said master stem;
   threads on the forward end of said master stem adapted to mate with the threads of a workpiece stop;
   a plurality of non-adjustable workpiece stops of different dimensions each having threads at one end mateable with the threads at the forward end of said master stem; and
   each of said non-adjustable workpiece stops having a fixed stop surface adjacent the threaded end thereof spaced a predetermined axial distance from the other end thereof which said fixed stop surface abuts a stop surface on the forward end of said master stem when mounted thereon whereby said stops can be substituted for one another with the outer end of the substituted stop in a predetermined distance from the forward end of the collet.

2. A workpiece clamping collet as defined in claim 1 characterized in that the forward end of said master stem is provided with a threaded axial bore and a threaded exterior, at least one of said workpiece stops having a threaded shank matable with said bore threads and at least one of said workpiece stops having a threaded bore matable with the threads on the exterior of the end of said master stem.

3. In a workpiece clamping collet as defined in claim 2 characterized in that the stop surface on the threaded end of said workpiece stops is located adjacent the innermost end of said thread.

4. In a workpiece clamping collet as defined in claim 1 characterized in that both ends of said master stem have a threaded axial bore, and a stop surface at the outer end of said bore engageable with a stop surface on a selected one of said set of workpiece stops.

5. In a workpiece clamping collet as defined in claim 4 characterized in the provision of a second set of workpiece stops of differing radii each having a threaded end mountable on one of the threaded ends of said master stem, each of said second set of stops having the same length when assembled to said master stem which length is different from the length of said first mentioned set of workpiece stops.

6. In a workpiece clamping collet mountable in a lathe spindle, that improvement which comprises:

a three piece workpiece stop-supporting subassembly and a plurality of nonadjustable workpiece stops of different predetermined dimensions adapted to be quickly and selectively assembled to said subassembly in a predetermined position relative to the forward end of said collet;

said subassembly comprising an exteriorly threaded master stem mounted axially of an internally threaded collar having a threaded shank provided with a shoulder engageable with the rear end of said collet when said subassembly is fully assembled to said collar, and a lock nut on said master stem for locking said collar in a desired position axially thereof, and said master stem having a stop surface on the end thereof for abutment with a selected one of said nonadjustable workpiece stops; and said plurality of workpiece stops having threads and an associated stop adjacent one end thereof for nonadjustable threaded assembly to said master stem with said master stem stop and said workpiece stop in firm abutment with one another when said selected workpiece is properly mounted thereon, and said workpiece stop being a known predetermined axial distance from the nonthreaded end thereof whereby said workpiece stops may be quickly substituted for one another with the outer end thereof in a known predetermined position relative to the outer end of said collet without need for making adjustments or measurements between the outer end of said collet and the outer end of the newly assembled one of said workpiece stops.

7. In a workpiece clamping collet as defined in claim 6 characterized in that the forward end of said master stem is provided with a threaded well and a threaded exterior selectively usable to engage a workpiece stop provided with either a threaded shank or a threaded well.

8. In a workpiece clamping collet as defined in claim 6 characterized in that both ends of said master stem are provided with a threaded well and a threaded exterior for use in supporting a selected one of said set of stops depending upon which end of said master stem is assembled forwardly of the forward end of said collar means.

* * * * *